United States Patent
Watanabe et al.

(10) Patent No.: US 7,771,794 B2
(45) Date of Patent: Aug. 10, 2010

(54) ACTIVE ENERGY RAY-CURABLE, ORGANOPOLYSILOXANE RESIN COMPOSITION, LIGHT-TRANSMITTING COMPONENT, AND METHOD FOR MANUFACTURING THE LIGHT-TRANSMITTING COMPONENT

(75) Inventors: Toshinori Watanabe, Ichihara (JP); Takuya Ogawa, Chiba (JP); Kasumi Takeuchi, Ichihara (JP); Makoto Yoshitake, Funabashi (JP); Shedric O. Glover, Midland, MI (US); Mary Kay Tomalia, Midland, MI (US)

(73) Assignees: Dow Corning Corporation, Midland, MI (US); Dow Corning Toray Company, Ltd., Tokyo (JP)

( * ) Notice: Subject to any disclaimer, the term of this patent is extended or adjusted under 35 U.S.C. 154(b) by 679 days.

(21) Appl. No.: 10/582,154

(22) PCT Filed: Dec. 10, 2004

(86) PCT No.: PCT/JP2004/018864

§ 371 (c)(1),
(2), (4) Date: May 25, 2007

(87) PCT Pub. No.: WO2005/056640

PCT Pub. Date: Jun. 23, 2005

(65) Prior Publication Data

US 2008/0058441 A1    Mar. 6, 2008

(30) Foreign Application Priority Data

Dec. 10, 2003    (JP) .............................. 2003-412452

(51) Int. Cl.
*C08G 77/04* (2006.01)
*G02B 6/028* (2006.01)
*C08J 7/04* (2006.01)

(52) U.S. Cl. ......................... 427/515; 522/148; 528/33; 385/124

(58) Field of Classification Search ................ 522/148; 528/33; 427/515; 385/124
See application file for complete search history.

(56) References Cited

U.S. PATENT DOCUMENTS

| 4,279,717 A |   | 7/1981 | Eckberg et al. |
| 5,198,476 A | * | 3/1993 | Kobayashi et al. ............. 522/31 |
| 5,217,805 A | * | 6/1993 | Kessel et al. ................ 428/352 |
| 5,340,898 A |   | 8/1994 | Cavezzan et al. |
| 5,360,833 A | * | 11/1994 | Eckberg et al. ................ 522/31 |
| 6,537,723 B1 | * | 3/2003 | Toyoda et al. ............. 430/270.1 |
| 6,803,171 B2 | * | 10/2004 | Gronbeck et al. ......... 430/270.1 |
| 6,832,036 B2 |   | 12/2004 | Ghoshal et al. |
| 7,534,820 B2 | * | 5/2009 | Kohno et al. ................... 522/31 |
| 2006/0199081 A1 | * | 9/2006 | McLaughlin et al. ........... 430/1 |
| 2008/0260337 A1 | * | 10/2008 | Bahadur et al. .............. 385/123 |

FOREIGN PATENT DOCUMENTS

| EP | 0355381 A1 | 2/1990 |
| EP | 0581542 A2 | 2/1994 |
| JP | 56038350 | 4/1981 |
| JP | 64000186 | 1/1989 |
| JP | 3043423 | 2/1991 |
| JP | 4157402 | 5/1992 |
| JP | 6041433 | 2/1994 |
| JP | 8193167 | 7/1996 |
| JP | 9124793 | 5/1997 |
| JP | 2000180643 | 6/2000 |
| JP | 2000230052 | 8/2000 |

OTHER PUBLICATIONS

English abstract for JP3043423 extracted from espacenet.com database Aug. 16, 2006.
English abstract for JP4157402 extracted from espacenet.com database Aug. 16, 2006.
English abstract for JP6041433 extracted from espacenet.com database Aug. 15, 2006.
English abstract for JP8193167 extracted from espacenet.com database Aug. 15, 2006.
English abstract for JP9124793 extracted from espacenet.com database Aug. 16, 2006.
English abstract for JP56038350 extracted from espacenet.com database Aug. 15, 2006.
English abstract for JP64000186 extracted from espacenet.com database Aug. 15, 2006.
English abstract for JP2000180643 extracted from espacenet.com database Feb. 17, 2007.
English abstract for JP2000230052 extracted from espacenet.com database Feb. 17, 2007.

* cited by examiner

*Primary Examiner*—Susan W Berman
(74) *Attorney, Agent, or Firm*—Howard & Howard Attorneys PLLC

(57) ABSTRACT

The present invention relates to an active energy ray-curable organopolysiloxane resin composition that comprises an organopolysiloxane resin having an epoxy group and an aromatic hydrocarbon group and a photopolymerization initiator, as well as to a light-transmitting component that comprises cured bodies produced by irradiating the aforementioned organopolysiloxane resin with active-energy rays in the presence of the aforementioned photopolymerization initiator, and to a method for manufacturing the aforementioned light-transmitting component.

14 Claims, No Drawings

ACTIVE ENERGY RAY-CURABLE, ORGANOPOLYSILOXANE RESIN COMPOSITION, LIGHT-TRANSMITTING COMPONENT, AND METHOD FOR MANUFACTURING THE LIGHT-TRANSMITTING COMPONENT

RELATED APPLICATIONS

This application claims priority to and all the advantages of International Patent Application No. PCT/JP2004/018864, filed on Dec. 10, 2004, which claims priority to Japanese Patent Application No. JP2003-412452, filed on Dec. 10, 2003.

TECHNICAL FIELD

The present invention relates to an active energy ray-curable organopolysiloxane resin composition that comprises an organopolysiloxane resin having an epoxy group and an aromatic hydrocarbon group and a photopolymerization initiator, as well as to a light-transmitting component that comprise cured bodies produced by irradiating the aforementioned organopolysiloxane resin with active-energy rays in the presence of the aforementioned photopolymerization initiator, and to a method for manufacturing the aforementioned light-transmitting component.

BACKGROUND ART

Quartz and glass are used not only for the manufacture of optical fibers but also for application as highly reliable materials required for optical communication. However, fabrication of these inorganic materials involves the use of high-temperature processes of low productivity, and therefore a demand exists for finding other easily fabricated and durable organic materials. In this connection, the most reliable material is polyimide which is an organic material that finds wide application in the production of electronic devices.

On the other hand, organopolysiloxanes are another alternative that attracts attention in the field of optoelectronics, due to its excellent characteristics such as high light transmittance, electrical insulation properties, optical stability, thermal stability, etc. Improvements in characteristics of existing polyimide and organopolysiloxane type materials are focused on physical properties of these materials that are most important for transmitting light signals, i.e., non-absorption of light in the communication wavelength range of 1300 to 1660 nm, optical properties without complex refraction caused by orientation of polymer chains, and provision of heat-resistant, water-proof and anti-moisture-absorption properties important for device assemblies.

Japanese Patent Application Publication (hereinafter referred to as "Kokai") H3-43423 discloses optical elements and optical materials made from a polysiloxane composed of $(R_1R_2SiO_{2/2})$ units (where $R_1$ and $R_2$ are groups formed by substituting hydrogen atoms of alkyl or phenyl groups with halogen atoms or deuteriums), from a polysiloxane composed of $(R_1SiO_{3/2})$ $(R_2SiO_{3/2})$ units (where $R_1$ and $R_2$ are groups formed by substituting hydrogen atoms of alkyl groups or phenyl groups with halogen atoms or deuteriums), or from copolymers that contain both units. Furthermore, Kokai H4-157402 discloses optical waveguides produced from similar polysiloxanes. The problems in connection with the aforementioned materials are high material cost associated with substitution of hydrogen atoms of alkyl or phenyl groups by halogen atoms or deuteriums, as well as low resistance to heat because of insufficient curing, and low resistance to solvents.

Kokai 2000-230052 discloses an optical material formed from a polymer composed of $(R_1SiO_{3/2}$ and $(R_1(HO)SiO_{2/2}$ units (where $R_1$ is a fluorinated alkyl group or a fluorinated arylalkyl group). This material is expensive as it contains fluorinated alkyl group or a fluorinated arylalkyl group. Curing of this material requires high temperatures and is time-consuming.

Kokai H9-124793 discloses an optical waveguide produced from a heat-curable polymer composed of $(R_1SiO_{3/2})$ units, $(R_1(HO)SiO_{2/2})$ units, $(R_1(EO)SiO_{2/2})$ units, and $(R_1R_2SiO_{2/2})$ units (where $R_1$ and $R_2$ are alkyl groups, phenyl groups, or aforementioned groups in which hydrogen atoms are substituted with halogen atoms or deuterium heavy hydrogen atoms, and E designates epoxy-containing organic groups). The same Kokai also describes an optical waveguide made from an ultraviolet ray-curable polymeric material prepared from the aforementioned polymer and a photopolymerization catalyst. However, since the epoxy-containing organic groups contained in the aforementioned materials are bonded to silicon via oxygen, the material is hydrolysable and therefore is poorly resistant to moisture. Furthermore, the material has low resistance to heat, and its refractive index is prone to changes after heat treatment.

Kokai 2000-180643 discloses the following compositions for use in optical waveguides: a composition prepared from an organic oligomer composed of $(PhSiO_{3/2})$ units and $(R_1SiO_{3/2})$ units (where $R_1$ is an alkyl group with 1 to 3 carbon atoms, and Ph is a phenyl group or its derivative) and a polymerization initiator; a composition prepared from an organic oligomer composed of $(PhSiO_{3/2})$ units and $(R_1R_2SiO_{2/2})$ units (where $R_1$ and $R_2$ are alkyl groups with 1 to 3 carbon atoms, and Ph is a phenyl group or its derivative) and a polymerization initiator; and a composition prepared from an organic oligomer composed of $(Ph(ZCH_2O)SiO_{3/2})$ units and $(PhSiO_{3/2})$ units (where Ph is a phenyl group or its derivative, and Z is an epoxy group) and a polymerization initiator. However, the first two of the aforementioned compositions have low photopolymerization capacity, while the third composition is subject to hydrolysis because epoxy-containing organic groups of this oligomer are bonded to silicon atoms by Si—O—C linkages. Furthermore, the above compositions have poor waterproof properties, low resistance to heat, and are subject to changes in their refractive indices after heat treatment.

On the other hand, Kokai S56-38350 discloses an ultraviolet ray-curable coating composition having an epoxy-functional polydiorganosiloxane and a bis-aryliodonium salt, while Kokai H6-41433 discloses an ultraviolet ray-curable coating composition composed of an onium borate and a linear organopolysiloxane having a trimethylsilyl terminal group and an epoxy group. However, since in both compositions the main component comprises a linear diorganopolysiloxane, a cured body obtained from such compositions has low physical strength and resistance to solvents and therefore these compositions are used as solely paper-coating or plastic film-coating for imparting to them the property of peelability or releasability against adhesives.

Kokai H8-193167 discloses a photosensitive resin composition consisting of a polysiloxane of the following formula: $(RRSiO_{2/2})$, a polysiloxane of the following formula: $(RSiO_{3/2})$, or a copolymer of the aforementioned polysiloxanes (where R represents an epoxy-containing alkyl substituent or a hydrocarbon group), and an acid-generating agent. However, the above composition finds application only as a resist and is not intended for use as an independent cured body. Specific examples of siloxane copolymers in which carbon atoms of epoxy groups are bonded directly to silicon atoms can not be prepared easily, and there is no explanation relating to such copolymers.

SUMMARY OF THE INVENTION

The problems solved by the present invention consist of the following: to provide an active energy ray-curable organopolysiloxane resin composition that can be rapidly cured when irradiated with active-energy rays (i.e., high-energy rays), such as ultraviolet rays, and that, even in the form of a film obtained by curing the composition, possesses excellent shape-maintaining capacity, resistance to solvent, high light transmittance in the range of communication wavelengths, and is characterized by high light transmittance and insignificant variations in the refractive index when exposed to high temperatures; to provide a light-transmitting component comprising a cured body of organopolysiloxane that, even in the form of a film obtained by curing the composition, possesses excellent shape-maintaining capacity, resistance to solvent, high light transmittance in the range of communication wavelengths, and is characterized by high light transmittance and insignificant variations in the refractive index when exposed to high temperatures; and to provide a, simple and efficient method of manufacturing the aforementioned light-transmitting component.

The inventors have conducted a study aimed at a solution of the aforementioned problems, and the results of this study led them to the present invention. More specifically, the present invention provides:

[1] An active energy ray-curable organopolysiloxane resin composition comprising:
(A) 100 parts by weight of an epoxy-containing organopolysiloxane resin represented by the following siloxane unit formula (1)

  (1)

(where $R^1$, $R^2$, $R^3$, $R^4$, $R^5$, and $R^6$ are organic groups selected from univalent aliphatic hydrocarbon groups with 1 to 6 carbon atoms, univalent aromatic hydrocarbon groups with 6 to 10 carbon atoms, and epoxy-containing univalent hydrocarbon groups, wherein in one molecule the siloxane units with epoxy-containing univalent hydrocarbon groups constitute 2 to 50 mole %, the univalent aromatic hydrocarbon groups with 6 to 10 carbon atoms constitute more than 15 mole % of all organic groups, and where the following conditions are satisfied: $a+b+c+d=1$; "a" on average satisfies the following condition: $0 \leq a<0.4$; "b" on average satisfies the following condition: $0<b<0.5$; "c" on average satisfies the following condition: $0<c<1$; "d" on average satisfies the following condition; $0 \leq d<0.4$; and "b" and "c" are bound by the following condition: $0.01 \leq b/c \leq 0.3$);
(B) 0.05 to 20 parts by weight of a photopolymerization initiator; and
(C) 0 to 5000 parts by weight of an organic solvent.
[2] The active energy ray-curable organopolysiloxane resin composition according to [1] for use as a cured body in the form of a film.
[3] The active energy ray-curable organopolysiloxane resin composition according to [1] for use as a light-transmitting component.
[4] The active energy ray-curable organopolysiloxane resin composition according to [3], wherein said light-transmitting component is an optical waveguide.
[5] An organopolysiloxane resin composition according to any of [1] to [4], wherein said active-energy rays are ultraviolet rays.
[6] A light-transmitting component obtained by curing (A) an epoxy-containing organopolysiloxane resin represented by the following siloxane unit formula (1)

  (1)

(where $R^1$, $R^2$, $R^3$, $R^4$, $R^5$, and $R^6$ are organic groups selected from univalent aliphatic hydrocarbon groups with 1 to 6 carbon atoms, univalent aromatic hydrocarbon groups with 6 to 10 carbon atoms, and epoxy-containing univalent hydrocarbon groups, wherein in one molecule the siloxane units with epoxy-containing univalent hydrocarbon groups constitute 2 to 50 mole %, the univalent aromatic hydrocarbon groups with 6 to 10 carbon atoms constitute more than 15 mole % of all organic groups, and where the following conditions are satisfied: $a+b+c+d=1$; "a" on average satisfies the following condition: $0 \leq a<0.4$; "b" on average satisfies the following condition: $0<b<0.5$; "c" on average satisfies the following condition: $0<c<1$; $0 \leq d<0.4$; and "b" and "c" are bound by the following condition: $0.01 \leq b/c \leq 0.3$) under effect of irradiation with active energy rays in the presence of (B) a photopolymerization initiator (where component (B) is used in an amount of 0.05 to 20 parts by weight for each 100 parts by weight of component (A)).
[7] The light-transmitting component according to [6], wherein said light-transmitting component is an optical waveguide.
[8] The light-transmitting component of [6], wherein said optical waveguide is made in the form of a film.
[9] The light-transmitting component of [6], wherein said active-energy rays are ultraviolet rays.
[10] A method of manufacturing a light-transmitting component, comprising the steps of: applying the active energy ray-curable organopolysiloxane resin composition of [1] onto a substrate; and curing the applied composition by irradiating it with active-energy rays.
[11] A method of manufacturing an optical waveguide, comprising the steps of 1) forming a lower cladding layer by applying an active energy ray-curable organopolysiloxane resin composition of [1] onto a substrate and by curing the applied material by irradiating it with active-energy rays; 2) forming a core layer by applying said active energy ray-curable organopolysiloxane resin composition of [1] (however, the refractive index of the cured body is greater than the refractive index of the cladding layer) onto said lower cladding layer and by curing the applied layer by irradiating it with active energy rays; if necessary, processing said core layer into a desired shape; and 3) forming an upper cladding layer by applying said active-energy rays-curable organopolysiloxane resin composition of [1] onto said core layer, or onto said core layer of a desired shape and said lower cladding layer, and curing the applied material by irradiating it with active-energy rays.

The active-energy ray-curable organopolysiloxane resin composition of the present invention can be rapidly cured by being irradiated with active-energy rays (i.e., high-energy rays), such as ultraviolet rays, and the obtained cured body, even in the form of a thin film, is characterized by excellent stability of shape. In particular, the cured body may possess hardness and elasticity without tendency to deformation, buckling, and formation of cracks. These properties allow the use of the material in the form of films and thin-film elements. A cured body obtained from the composition is characterized by high light transmittance with minimal light-transmission losses. The refractive index can be controlled much easier than with the prior-art technique, while exposure of the material to high temperatures almost does not change either light transmittance or refractive index. Therefore, the active energy ray-curable organopolysiloxane resin composition of the present invention is well suited for the manufacture of light-transmitting components.

On the other hand, the light-transmitting component of the present invention has excellent shape stability and resistance to solvents, is characterized by high coefficient of light transmittance in the range of communication wavelengths, and has minimal variations in light transmittance and refractive index. Therefore, this material is suitable for use in optical communication and for the manufacture of optical integrated circuits.

The method of the present invention for the manufacture of light transmitting components is simple, efficient, and suitable for industrial application. The method simplifies shaping of the core and requires much shorter time for manufacture than conventional reactive ion etching.

BEST MODE FOR CARRYING OUT THE INVENTION

An epoxy-containing organopolysiloxane resin (A) represented by the following siloxane unit formula (1)

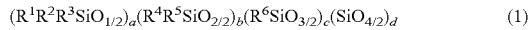  (1)

(where $R^1$, $R^2$, $R^3$, $R^4$, $R^5$, and $R^6$ are organic groups selected from univalent aliphatic hydrocarbon groups with 1 to 6 carbon atoms, univalent aromatic hydrocarbon groups with 6 to 10 carbon atoms, and epoxy-containing univalent hydrocarbon groups; one molecule contains 2 to 50 mole % of silicone units with epoxy-containing univalent hydrocarbon groups; more than 14 mole % of all organic groups are univalent aromatic hydrocarbon group with 6 to 10 carbon atoms; and the following conditions are satisfied: a+b+c+d=1; "a" on average satisfies the following condition: $0 \leq a < 0.4$; "b" on average satisfies the following condition: $0 < b < 0.5$; "c" on average satisfies the following condition: $0 < c < 1$; "d" on average satisfies the following condition; $0 \leq d < 0.4$; and "b" and "c" are bound by the following condition: $0.01 \leq b/c \leq 0.3$); where a, b, c, and d designate an average mole number of each siloxane unit for the case where the sum of these mole units is equal to 1, in other words, these symbols show an average mole % or share of each siloxane unit in one molecule; thus (a+b+c+d)=1. Since this component contains an epoxy group, it can be rapidly cured in the presence of a photopolymerization initiator (B) by irradiating it with active-energy rays, such as untraviolet rays.

The epoxy-containing organopolysiloxane resin (A) contains $(R^4R^5SiO_{2/2})$ and $(R^6SiO_{3/2})$ as indispensable units. If necessary, however, the resin may contain arbitrary structural units $(R^1R^2R^3SiO_{1/2})$ and $(SiO_{4/2})$. In other words, the epoxy-containing organopolysiloxane resin may be composed of the units shown in the following formulae:

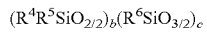

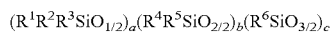

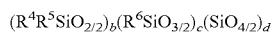

If the content of the $(R^1R^2R^3SiO_{1/2})$ units is too high, the molecular weight of the epoxy-containing organopolysiloxane resin is reduced, and the following condition takes place: $0.1 \leq a < 0.4$. If $(SiO_{4/2})$ units are introduced under this condition, a cured body of the epoxy-containing organopolysiloxane resin (A) may become very hard and brittle. Therefore, it is recommended to provide the following condition: $0.1 \leq d < 0.4$, preferably $0.1 \leq d < 0.2$, and even more preferably, d=0. The mole ratio b/c of the indispensable structural units $(R^4R^5SiO_{2/2})$ and $(R^6SiO_{3/2})$ should be greater than 0.01 and preferably smaller than 0.3. Beyond these limits, the production of the aforementioned epoxy-containing organopolysiloxane resin (A) will be either accompanied by the formation of insoluble by-products, or the body obtained by curing the composition will be subject to decrease in toughness and to generation of cracks, as well as to significant decrease in strength and elasticity. It is recommended that the mole ratio b/c be greater than 0.01 but smaller than 0.25 and preferably is within the range of 0.02 to 0.25. Since the epoxy-containing organopolysiloxane resin (A) contains $(R^4R^5SiO_{2/2})$ and $(R^6SiO_{3/2})$ as indispensable units, the molecular structure may vary mainly between branched, net-like and three-dimensional.

The aforementioned univalent saturated aliphatic hydrocarbon groups having 1 to 6 silicon-bonded carbon atoms may be represented by methyl groups, ethyl groups, propyl groups, butyl groups, hexyl groups, or similar univalent saturated aliphatic hydrocarbon groups; and vinyl groups, allyl groups, hexenyl groups, or similar univalent unsaturated aliphatic hydrocarbon groups. The silicon-bonded aromatic univalent hydrocarbon groups with 6 to 10 carbon atoms can be represented by phenyl groups, tolyl groups, xylyl groups, and naphthyl groups.

The refractive index, which is an important optical property of the material of the invention, can be adjusted by changing the types of univalent hydrocarbon groups. If the main substituent comprises a univalent aliphatic hydrocarbon group such as a methyl group, the refractive index can easily be made smaller than 1.5. If the main substituent comprises a univalent aromatic hydrocarbon group such as a phenyl group, the refractive index can easily be made equal to or greater than 1.5. It is preferable that the aforementioned univalent saturated aliphatic hydrocarbon groups comprise methyl groups, and that aforementioned univalent unsaturated aromatic hydrocarbon groups comprise phenyl groups. In the case of univalent unsaturated aliphatic hydrocarbon groups, the use of vinyl groups is recommended.

It is recommended that, in component (A), more than 15 mole %, preferably more than 20 mole %, and even more preferably more than 25 mole % of all organic groups comprise univalent aromatic hydrocarbon groups. If the univalent aromatic hydrocarbon groups are contained in an amount below the recommended lower limit, the cured body obtained from the composition will have a reduced light transmittance in the range of communication wavelengths. This will also lead to decrease in toughness with possibility of development of cracks in the cured body.

In component (A), siloxane units having epoxy-containing univalent hydrocarbon group should constitute 2 to 50 mole %, preferably 10 to 40 mole %, and even more preferably 15 to 40 mole % of all siloxane units. If the aforementioned siloxane units are contained in an amount below 2 mole %, this will lead to a decrease in a degree of cross-linking during curing of the composition. As a result, the obtained light-transmitting component will not be sufficiently hard. If, on the other hand, the content of the aforementioned units exceeds 50 mole %, the cured body will have reduced light transmittance and low resistance to heat. It is recommended that the epoxy groups available in the aforementioned epoxy-containing univalent hydrocarbon groups do not have direct connection to silicon and that connection to silicon atoms be carried out through alkylene groups.

Some examples are given below:

3-(glycidoxy)propyl group:

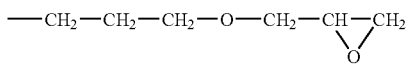

2-(glycidoxycarbonyl)propyl group:

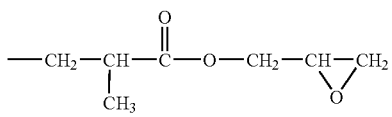

2-(3,4-epoxycyclohexyl)ethyl group,

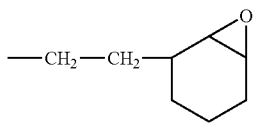

2-(4-methyl-3,4-epoxycyclohexyl)propyl group; and

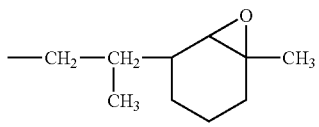

The following are specific examples of epoxy-containing organopolysiloxane resins: organopolysiloxane resins composed of $(Me_2SiO_{2/2})$, $(PhSiO_{3/2})$, and $(E^1SiO_{3/2})$ units; organopolysiloxane resins composed of $(Me_3SiO_{1/2})$, $(Me_2SiO_{2/2})$, $(PhSiO_{3/2})$, and $(E^1SiO_{3/2})$ units; organopolysiloxane resins composed of $(Me_2SiO_{2/2})$, $(PhSiO_{3/2})$, $(E^1SiO_{3/2})$ and $(SiO_{4/2})$ units; organopolysiloxane resins composed of $(Me_2SiO_{2/2})$, $(PhSiO_{3/2})$, $(MeSiO_{3/2})$, and $(E^1SiO_{3/2})$ units; organopolysiloxane resins composed of $(Ph_2SiO_{2/2})$, $(PhSiO_{3/2})$, and $(E^1SiO_{3/2})$ units; organopolysiloxane resins composed of $(MePhSiO_{2/2})$, $(PhSiO_{3/2})$, and $(E^1SiO_{3/2})$ units; organopolysiloxane resins composed of $(Me_2SiO_{2/2})$, $(PhSiO_{3/2})$, and $(E^2SiO_{3/2})$ units; organopolysiloxane resins composed of $(Me_2SiO_{2/2})$, $(PhSiO_{3/2})$, and $(E^3SiO_{3/2})$ units; organopolysiloxane resins composed of $(Me_2SiO_{2/2})$, $(PhSiO_{3/2})$, and $(E^4SiO_{3/2})$ units; organopolysiloxane resins composed of $(MeViSiO_{2/2})$, $PhSiO_{3/2})$, and $(E^3SiO_{3/2})$ units; organopolysiloxane resins composed $(Me_2SiO_{2/2})$, $(PhSiO_{3/2})$, $(MeSiO_{3/2})$, and $(E^3SiO_{3/2})$ units; organopolysiloxane resins composed of $(Ph_2SiO_{2/2})$, $(PhSiO_{3/2})$, and $(E^3SiO_{3/2})$ units; organopolysiloxane resins composed of $(Me_2SiO_{2/2})$, $(Ph_2SiO_{2/2})$, and $(E^1SiO_{3/2})$, units; organopolysiloxane resins composed of $(Me_2SiO_{2/2})$, $(Ph_2SiO_{2/2})$, and $(E^3SiO_{3/2})$ units; organopolysiloxane resins composed of $(Me_2ViSiO_{1/2})$, $(Me_2SiO_{2/2})$, $(PhSiO_{3/2})$, and $(E^1SiO_{3/2})$ units; organopolysiloxane resins composed of $(Me_3SiO_{1/2})$, $(Ph_2SiO_{2/2})$, $(PhSiO_{3/2})$, and $(E^1SiO_{3/2})$ units; organopolysiloxane resins composed of $(Me^3SiO_{1/2})$, $(Me_2SiO_{2/2})$, $(PhSiO_{3/2})$, and $(E^3SiO_{3/2})$ units; organopolysiloxane resins composed of $(Me_2SiO_{2/2})$, $(PhSiO_{3/2})$, $(E^3SiO_{3/2})$, and $(SiO_2)$ units; organopolysiloxane resins composed of $(Me_2SiO_{2/2})$, $(Ph_2SiO_{2/2})$, $(E^1SiO_{3/2})$, and $(SiO_2)$ units; organopolysiloxane resins composed of $(Me^3SiO_{1/2})$, $(Me_2SiO_{2/2})$, $(PhSiO_{3/2})$, $(E^1SiO_{3/2})$, and $(SiO_2)$ units; organopolysiloxane resins composed of $(Me^3SiO_{1/2})$, $(Me_2SiO_{2,2})$, $(PhSiO_{3/2})$, $(E^3SiO_{3/2})$, and $(SiO_2)$ units [where Me designates a methyl group, Vi designates a vinyl group, Ph designates a phenyl group, $E^1$ designates a 3-(glycidoxy)propyl group, $E^2$ designates a 2-(glycidoxycarbonyl)propyl group, $E^3$ designates a 2-(3,4-epoxycyclohexyl) ethyl group, and $E^4$ designates 2-(4-methyl-3,4-epoxycyclohexyl)propyl group. The same designations are applicable to the descriptions given hereinafter.]

The aforementioned epoxy-containing organopolysiloxane resins can be prepared by methods known in the art, as described, e.g., in Kokai H6-298940. For example, the following methods are applicable: a method in which a silane of formula $R^4R^5SiCl_2$ and a silane of formula $R^6SiCl_3$ are cohydrolyzed and condensed; a method in which a silane of formula $R^4R^5SiCl_2$, a silane of formula $R^6SiCl_3$ and a silane of formula $R^1R^2R^3SiCl$ are cohydrolyzed and condensed; a method in which a silane of formula $R^4R^5SiCl_2$, a silane of formula $R^6SiCl_3$ and a silane of formula $SiCl_4$ are cohydrolyzed and condensed; a method in which a silane of formula $R^4R^5SiCl_2$, a silane of formula $R^6SiCl_3$, a silane of formula $R^1R^2R^3SiCl$, and a silane of formula $SiCl_4$ are cohydrolyzed and condensed; and a method in which silanes wherein chlorine atoms bonded to silicon are substituted by methoxy or ethoxy groups are cohydrolyzed and condensed (where $R^1$, $R^2$, $R^3$, $R^4$, $R^5$, and $R^6$ are organic groups selected from univalent aliphatic hydrocarbon groups with 1 to 6 carbon atoms, univalent aromatic hydrocarbon groups with 6 to 10 carbon atoms, and epoxy-containing univalent hydrocarbon groups).

Another applicable method consists of producing a silanol-containing methylphenylpolysiloxane resin by cohydrolyzing and condensing a mixture of dimethyldichlorosilane and phenyltrichlorosilane or a mixture of dimethyldichlorosilane, methyltrichlosilane and phenyltrichlorosilanethen, making the reaction system basic, carrying out a condensation reaction after adding an epoxy-containing organotrialkoxysilane, such as 3-(glycidoxy) propyltrimethoxysilane, and thus producing a methylphenylpolysiloxane resin in which an epoxy group, such as a 3-(glycidoxy) propyl group, is bonded to silicon. In the average unit formula (1), values of "a,", "b", "c" and "d" can be adjusted via amounts of starting silanes and their mole ratios.

The aforementioned organopolysiloxane resin may have some residual alkoxy groups and hydroxyl groups remaining on silicon atoms. The content of these groups may depend on the method of manufacture and manufacturing conditions. These substituents may affect storage stability of the aforementioned organopolysiloxane resin and reduce thermal stability of the cured body of the organopolysiloxane resin. Therefore, it is necessary, as much as possible, to restrict the formation of such groups. For example, the amount of the aforementioned substituents can be reduced by heating the organopolysiloxane resin in the presence of a minute quantity of potassium hydroxide, thus causing a dehydration and condensation reaction or a de-alcoholation and condensation reaction. It is recommended that the content of the aforementioned substituents be no more than 2 mole % and preferably no more than 1 mole % of all substituents on silicon atoms.

Although there are no special restrictions with regard to the number-average molecular weight of the epoxy-containing organopolysiloxane resin (A), from the view point of rigidity of a cured body and improved solubility in organic solvents, it is recommended for this resin to have the number-average molecular weight between $10^3$ and $10^6$.

There are no special restrictions with regard to the photopolymerization initiator (B) suitable for initiating photopolymerization of the epoxy-containing organopolysiloxane (A) for the present invention. Examples of this component may include sulfonium salts, iodinium salts, selenonium salts, phosphonium salts, diazonium salts, paratoluene sulfonate, trichloromethyl-substituted triazine, and trichloromethyl-substituted benzene.

The sulfonium salts can be expressed by the following formula: $R^7_3S^+X^-$, where $R^7$ may designated a methyl group, ethyl group, propyl group, butyl group, or a similar alkyl group with 1 to 6 carbon atoms; a phenyl group, naphthyl group, biphenyl group, tolyl group, propylphenyl group, decylphenyl group, dodecylphenyl group, or a similar aryl or a substituted-aryl group with 6 to 24 carbon atoms. In the above formula, $X^-$ represents $SbF_6^-$, $AsF_6^-$, $PF_6^-$, $BF_4^-$, $B(C_6F_5)_4^-$, $HSO_4^-$, $ClO_4^-$, $CF_3SO_3^-$, or similar non-nucleophilic, non-basic anions. The iodonium salts can be represented by the following formula: $R^7_2I^+X^-$, where $R^7$ is the same as $X^-$ defined above. The selenonium salt can be represented by the following formula: $R^7_3Se^+X^-$, where $R^7$, $X^-$ are the same as defined above. The phosphonium salt can be represented by the following formula: $R^7_4P^+X^-$, wherein $R^7$, $X^-$ are the same as defined above. The diazonium salt can be represented by the following formula: $R^7N_2^+X^-$, where $R^7$ and $X^-$ are the same as defined above. The paratoluene sulfonate can be represented by the following formula: $CH_3C_6H_4SO_3R^8$, wherein $R^8$ is an organic group that contains an electron-withdrawing group, such as a benzoylphenylmethyl group, or a phthalimide group. The trichloromethyl-substituted triazine can be represented by the following formula: $[CCl_3]_2C_3N_3R^9$, wherein $R^9$ is a phenyl group, substituted or unsubstituted phenylethynyl group, substituted or unsubstituted furanylethynyl group, or a similar electron-withdrawing group. The trichloromethyl-substituted benzene can be represented by the following formula: $CCl_3C_6H_3R^7R^{10}$, wherein $R^7$ is the same as defined above, $R^{10}$ is a halogen group, halogen-substituted alkyl group, or a similar halogen-containing group.

The following are examples of photopolymerization initiators recommended for use in view of their ready availability and good miscibility with the epoxy-containing organopolysiloxane resin (A): triphenylsulfonium tetrafluoroborate, triphenylsulfonium hexafluoroantimonate, triphenylsulfonium trifurate, tri(p-tolyl)sulfonium hexafluorophosphate, p-tertiarybutylphenyl diphenylsulfonium hexafluoroantimonate, diphenyliodonium tetrafluoroborate, diphenyliodonium hexafluoroantimonate, p-tertiarybutylphenyl biphenyliodonium hexafluoroantimonate, di(p-tertiarybutylphenyl)iodonium hexafluoroantimonate, bis (dodecylphenyl)iodonium hexafluoroantimonate, triphenylselenonium tetrafluoroborate, tetraphenylphosphonium tetrafluoroborate, tetraphenylphosphonium hexafluoroantimonate, p-chlorophenyldiazonium tetrafluoroborate, benzoylphenyl paratolyenesulfonate, bistrichloromethylphenyl triazine, bistrichloromethyl furanyltriazine, p-bistrichloromethyl benzene, etc. Of these, the most preferable are triphenylsulfonium tetrafluoroborate, di-(p-tertiarybutylphenyl) iodonium hexafluoroantimonate, bis (dodecylphenyl) iodonium hexafluoroantimonate, and p-chlorophenyldiazonium tetrafluoroborate.

The organic solvent (C) is not an indispensable component, but may be required if at a temperature of molding the epoxy-containing organopolysiloxane resin (A) is in a solid state or is a highly-viscous liquid. It may also be required if the epoxy-containing organopolysiloxane resin (A) is formed into a film. The organic solvent (C) may also be required when the photopolymerization initiator (B) is not dissolved in the epoxy-containing organopolysiloxane resin (A). There are no special restrictions with regard to the type of the organic solvent (C), if the epoxy-containing organopolysiloxane resin (A) and the photopolymerization initiator (B) are both soluble in this solvent. It is recommended, however, to use the solvent with the boiling point within the temperature range of 80° C. to 200° C. The following are specific examples of such solvents: isopropyl alcohol, tertiarybutyl alcohol, methylethylketone, methylisobutylketone, toluene, xylene, mesitylene, chlorobenzene, ethyleneglycoldimethylether, ethyleneglycoldiethylether, diethyleneglycoldimethylether, ethoxy-2-propanolacetate, methoxy-2-propanolacetate, octamethylcyclotetrasiloxane, hexamethyldisiloxane, etc. The aforementioned solvents can be used separately or in combinations of two or more.

The active energy ray-curable organopolysiloxane resin composition of the present invention comprises 100 parts by weight of the epoxy-containing organopolysiloxane resin (A), 0.05 to 20 parts by weight of the photopolymerization initiator (B), and 0 to 5000 parts by weight of the organic solvent (C). If component (A) is liquid or if components (A) and (B) have very good miscibility, component (C) may not be required. If component (B) is used in an amount of less than 0.05 parts by weight, the composition may not be cured to a sufficient degree. If, on the other hand, the amount of component (B) exceeds 20 parts by weight, the obtained material may have unacceptable optical characteristics due to the presence of the residual catalyst. Furthermore, if component (C) is used in an amount exceeding 5000 parts by weight, it will be difficult to obtain a thin film of good quality in the below-described process of manufacturing of the light-transmitting component. The optimal amount of component (C) may vary depending on the type, state, and solubility of components (A) and (B). In general, however, it is used in an amount of 1 to 1000 parts by weight, preferably, 1 to 500 parts by weight.

Normally, when the active energy rays-curable organopolysiloxane resin composition of the present invention is intended for the preparation of cured bodies in the form of a film or light-transmitting elements, it is used in the form of a liquid with a viscosity of 20 to 10,000 mPa·s at 25° C. Beyond the recommended range of viscosities; the composition will be difficult to treat, and it will be difficult to obtain optically acceptable thin films.

The refractive index of a cured body produced from the active-energy ray-curable resin composition of the present invention can be precisely adjusted by changing a mole ratio of univalent aliphatic hydrocarbon groups (typically, methyl groups) and univalent aromatic hydrocarbon groups (typically, phenyl groups) that comprise substituents of the epoxy-containing organopolysiloxane resin (A). An increase in the proportion of the univalent aromatic hydrocarbon groups increases the refractive index, while an increase in the share of the univalent aliphatic groups decreases the refractive index.

When the active energy ray-curable organopolysiloxane resin composition of the present invention is used for the manufacture of optical waveguides, it is required that the cured body of the organopolysiloxane resin intended for the core portion has a higher refractive index than the cured body of the organopolysiloxane resin intended for the cladding portion. Therefore, the organopolysiloxane resin composition intended for the core portion should have a greater content of the univalent aromatic hydrocarbon groups than the organopolysiloxane resin composition intended for the cladding portion. In view of the above, it is possible to utilize separation methods for separating two different types of organopolysiloxane resins for core and cladding in order to maintain them in different mole ratios, and/or to utilize mixing methods for mixing the aforementioned organopolysiloxanes in different mixing ratios.

A light-transmitting component comprising a cured body obtained by curing the epoxy-containing organopolysiloxane resin (A) in the presence of the photopolymerization initator (B) may have excellent shape-maintaining properties irrespective of whether it is made in the form of a conventional film or a thin film. More specifically, this material has hardness and elasticity that does not allow the material to be easily deformed. Furthermore, the material is free of any noticeable cracks or warps. Furthermore, in the range of a visible light, the material excludes reflection and provides light transmittance equal almost to 100%. In measurements with a polarization element, the aforementioned material makes it possible to reduce the complex refractive index to a negligibly small value, since the material is not sensitive to the& polarization light. When the material is heated, it preserves its initial shape up to 260° C., and the weight change factor is kept below 1%. Therefore, it can be stated that the light-transmitting component of the present invention has thermal resistance higher than such optical thermoplastic materials as a fluorinated polymethylmethacrylate resin.

The light-transmitting component of the present invention is applicable for both passive-system elements and active-system elements. The following are examples of such applications: non-branched type optical waveguides, wave division multiplexers [WDM], branched optical waveguide, optical adhesives or similar passive light-transmitting elements, optical waveguide switches, optical attenuators, and optical amplifiers or similar active light-transmitting elements.

The following description will relate to a method for manufacturing light-transmitting components in the form of cured bodies of the epoxy-containing organopolysiloxane resin (A) produced by irradiating the aforementioned resin (A) in the presence of the photopolymerization initiator. The aforementioned light-transmitting component is manufactured by a method that comprises the steps 1) and 2) described below. In step 1), the active-energy ray-curable organopolysiloxane resin composition is uniformly spread on the surface of a substrate, and, if necessary, solvent (C) is removed by drying or heating, whereby a thin film of uniform thickness composed of epoxy-containing organopolysiloxane resin (A) and photopolymerization initiator (B) is formed.

The substrate used for this purpose should have a smooth surface and be stable with regard to the solvent, the active-energy rays, and heat. Examples of such substrate include silicon wafers, glass, ceramics, and heat-resistant plastics. The composition is normally applied by spin coating and is then heated at a temperature between 30° C. and 120° C. In step 2), the obtained thin film is cured by irradiating it with active-energy rays. The active-energy rays may comprise ultraviolet rays, electron beams, or other radiation. The use of ultraviolet rays is preferable from the point of view of low cost and high stability. A source of ultraviolet radiation may comprise a high-pressure mercury lamp, medium-pressure mercury lamp, Xe—Hg lamp, or a deep UV lamp. The amount of radiation should be within the range of 100 to 8000 mJ/cm$^2$. For some types of active energy ray-curable organopolysiloxanes the use only of the active energy ray radiation may appear to be insufficient. In this case, heating (hereinafter referred to as "post-heating") may be required to complete curing of the thin film. The post-heating temperature should be within the range of 50 to 200° C.

Thus, the light-transmitting component of high light transmittance in a designated wavelength range is produced by 1) applying the active-energy ray-curable organopolysiloxane resin composition onto a substrate, 2) irradiating the applied active-energy ray-curable organopolysiloxane resin composition with active-energy rays, such as ultraviolet rays, and, if necessary, subjecting the composition to post-heating. If necessary, the material can be produced in the form of a separate film by peeling the coating off from the substrate. An optical waveguide, which is a typical example of application for a light-transmitting component, can be produced by repeating steps 1) and 2). Given below is a typical example of manufacturing an optical waveguide.

First, an active energy ray-curable organopolysiloxane resin composition for the cladding layer is applied by spin coating onto a substrate, and the applied material is cured by irradiation with active-energy rays to form a lower cladding layer. Following this, an active energy ray-curable organopolysiloxane resin composition for the core layer is applied by spin coating onto the lower cladding layer, if necessary, the core layer is subjected to forming for imparting to it a desired shape, and is then cured to form a cured core layer with the refractive index greater than that of the cladding layer. The core layer may be treated for imparting to it a desired shape, e.g., for patterning. This shape can be formed by exposing the core layer to active-energy rays through a drawn mask, if necessary, with subsequent heating, and the unexposed areas are removed by dissolving with an organic solvent. It is recommended that this solvent comprise solvent (C). The surface of the aforementioned core layer, or of the patterned core layer, and of the lower cladding layer is coated with the active energy ray-curable organopolysiloxane resin composition intended specially for cladding, and after the composition is cured and the formation of the upper cladding layer is completed, a film-type optical waveguide having a cladding-core-cladding structure is produced.

Similar to the procedure described earlier, the obtained coating can be peeled off from the substrate to form a film-type optical waveguide. Furthermore, the lower cladding layer may also be peeled off from the substrate. A new core layer can be formed on the separated cladding layer and then coated with an upper cladding layer, whereby another film-type optical waveguide can be formed. The cured bodies of the active energy ray-curable organopolysiloxane resin composition intended for cores should have refractive indices greater than those of the cured bodies produced from the active energy ray-curable organopolysiloxane resin composition for claddings. If necessary, a solvent-cast method can be used instead of spinning for application of the active energy ray-curable organopolysiloxane resin compositions.

EXAMPLES

The present invention will now be described with reference to specific practical examples, which, however, should not be construed as limiting the scope of the present invention. The structure of the epoxy-containing organopolysiloxane resin used in the examples was determined by means of $^{13}$CNMR and $^{29}$SiNMR analyses. The number-average molecular weight was measured with the use of GPC, and was recalculated with reference to a polystyrene standard. The content of silanol groups and methoxy groups was determined by $^{29}$Si NMR analysis. The source of the active-energy rays for curing the active energy ray-curable organopolysiloxane resin compositions comprised a deep UV radiation device (the product of Yamashita Denso Co., Ltd.). The refractive indices of cured bodies were determined by the prism coupling method and were measured at the wavelength of 1.55 μm with the use of the ALPHA-STEP 200 produced by Tencor Instruments. Light transmittance through the cured body was measured with the use of an automatic spectrophotometer by passing the 1550 nm wavelength light through a 5 mm-thick flat plate. Optical losses in cured bodies were determined at 1550 nm by the prism coupling method, and in optical waveguides at 1550 nm by the cut-back method. Effects of polarization light on a cured body were observed under a microscope utilizing a polarization element. Thermal resistance of a cured body was evaluated by thermogravimetric analysis based on registering changes in weight by heating a sample till 280° C. at a rate of 10° C./min. In the subsequent average unit formulae, Me, Ph, Vi, $E^3$ designate methyl groups, phenyl groups, vinyl groups, and 2-(3,4-epoxycyclohexyl) ethyl groups, respectively.

Reference Example 1

Preparation of Epoxy-Containing Organopolysiloxane Resin (A1)

A solution of a silanol-containing methylphenylpolysiloxane resin was prepared by co-hydrolyzing and condensing a mixture of 47 g of dimethyldichlorosilane, 505 g of phenyltrichlorosilane in a mixture of 500 g of toluene, 142 g of 2-propanol, and 142 g of water. The solution was neutralized with a saturated aqueous solution of sodium hydrogencarbonate, washed with water, and then water was completely removed by heating. The residual solution was combined with 226 g of 3,4-epoxycyclohexyl) ethyltrimethoxysilane and 2 g of a 50 wt % aqueous solution of potassium hydroxide, and then, while the solution was heated and stirred, the water, methanol, and toluene were removed by azeotropic dehydration. In this operation, an appropriate amount of toluene was added, and concentration of solids was maintained at about 50 wt %. Upon completion of the silanol dehydration condensation reaction, refluxing was continued for several hours till completion of the equilibrium reaction. The product was cooled, the reaction system was neutralized with a solid acidic adsorbent, and the aforementioned adsorbent was removed by filtering. The resulting product comprised a toluene solution (499 g of solids) of an epoxy-containing organopolysiloxane resin represented by the following average unit formula: $[Me_2SiO_{2/2}]_{0.10} [PhSiO_{3/2}]_{0.65} [E^3SiO_{3/2}]_{0.25}$. In the obtained epoxy-containing organopolysiloxane resin, the number-average molecular weight was 2500, the content of the phenyl groups was 59 mole %, and the total content of the silanol groups and methoxy groups was 0.8 mole %. The toluene was removed by the method described in subsequent practical examples.

Reference Example 2

Preparation of Epoxy-Containing Organopolysiloxane Resin (A2)

A toluene solution (490 g of solids) of an epoxy-containing organopolysiloxane resin represented by the following average unit formula: $[Me_2SiO_{2/2}]_{0.10} MeSiO_{3/2}]_{0.30} [PhSiO_{3/2}]_{0.35}[E^3SiO_{3/2}]_{0.25}$ was prepared by means of the same reaction as in Reference Example 1, with the exception that the starting material was composed of 315 g of phenyltrichlorosilane, 191 g of methyltrichlorosilane, 55 g of dimethyldichlorosilane, and 262 g of 2-(3,4-epoxycyclohexyl)ethyltrimethoxysilane. In obtained epoxy-containing organopolysiloxane resin, the number-average molecular weight was 3700, the content of the phenyl groups was 32 mole %, and the total content of the silanol groups and methoxy groups was 0.9 mole %. The toluene was removed by the method described in the subsequent practical examples.

Reference Example 3

Preparation of Epoxy-Containing Organopolysiloxane Resin (A3)

A toluene solution (490 g of solids) of an epoxy-containing organopolysiloxane resin represented by the following average unit formula: $[Me_2ViSiO_{1/2}]_{0.10} [Me_2SiO_{2/2}]_{0.05} [PhSiO_{3/2}]_{0.55} [E^3SiO_{3/2}]_{0.30}$ was prepared by means of the same reaction as in Reference Example 1, with the exception that the starting material was composed of 423 g of phenyltrichlorosilane, 23.5 g of dimethyldichlorosilane, 39.5 g of trimethoxychlorosilane, and 269 g of 2-(3,4-epoxycyclohexyl) ethyltrimethoxysilane. In the obtained epoxy-containing organopolysiloxane resin, the number-average molecular weight was 1700, the content of the phenyl groups was 44 mole %, and the total content of the silanol groups and methoxy groups was 0.6 mole %. The toluene was removed by the method described in subsequent practical examples.

Reference Example 4

Preparation of Epoxy-Containing Organopolysiloxane Resin (A4)

A toluene solution (499 g of solids) of an epoxy-containing organopolysiloxane resin represented by the following average unit formula: $[MeViSiO_{2/2}]_{0.10} [PhSiO_{3/2}]_{0.65} [E^3SiO_{3/2}]_{0.25}$ was prepared by means of the same reaction as in Reference Example 1, with the exception that the starting material was composed of 505 g of phenyltrichlorosilane, 52 g of methylvinyldichlorosilane, and 226 g of 2-(3,4-epoxycyclohexyl)ethyltrimethoxysilane. In the obtained epoxy-containing organopolysiloxane resin, the number-average molecular weight was 2600, the content of the phenyl groups was 59 mole %, and the total content of the silanol groups and methoxy groups was 0.8 mole %. The toluene was removed by the method described in subsequent practical examples.

Reference Example 5

Preparation of Epoxy-Containing Organopolysiloxane Resin (A5)

A toluene solution (499 g of solids) of an epoxy-containing organopolysiloxane resin represented by the following average unit formula: $[Me_2SiO_{2/2}]_{0.15} [PhSiO_{3/2}]_{0.50} [E^3SiO_{3/2}]_{0.25} [SiO_{4/2}]_{0.10}$ was prepared by means of the same reaction as in Reference Example 1, with the exception that the starting material was composed of 424 g of phenyltrichlorosilane, 77 g of dimethyldichlorosilane, 61 g of tetramethoxysilane, and 246 g of 2-(3,4-epoxycyclohexyl)ethyltrimethoxysilane. In the obtained epoxy-containing organopolysiloxane resin, the number-average molecular weight was 3900, the content of the phenyl groups was 48 mole %, and the total content of the silanol groups and methoxy groups was 1.0 mole %. The toluene was removed by the method described in the subsequent practical examples.

Practical Example 1

Manufacturing of a Cured Body of Epoxy-Containing Organopolysiloxane Resin

Ultraviolet-ray-curable organopolysiloxane resin compositions 1 through 5 were prepared by mixing epoxy-containing organopolysiloxane resins (A1), (A2), (A3), (A4) or (A5)

with bis(dodecylphenyl) iodoniumhexafluoroantimonate as a photopolymerization initiator (B) and with toluene as an organic solvent in amounts (in terms of weight units) shown in Table 1.

TABLE 1

|  | Composition 1 | Composition 2 | Composition 3 | Composition 4 | Composition 5 |
|---|---|---|---|---|---|
| (A1) | 30.0 | | | | |
| (A2) | | 30.0 | | | |
| (A3) | | | 30.0 | | |
| (A4) | | | | 30.0 | |
| (A5) | | | | | 30.0 |
| (B) | 1.0 | 1.0 | 1.0 | 1.0 | 1.0 |
| (C) | 30.0 | 30.0 | 30.0 | 30.0 | 30.0 |
| Refractive index | 1.53 | 1.50 | 1.54 | 1.54 | 1.53 |
| Light transmittance (%) | 95.8 | 94.0 | 95.0 | 95.9 | 95.2 |
| Decrease in weight (%) | 0.9 | 0.9 | 1.0 | 0.9 | 0.8 |

In a closed chamber system, the aforementioned liquid compositions were applied onto silicon substrates by 30 sec. spin coating at 2000 rpm, and the toluene was then removed by heating the coating for 15 min. at 50° C. The thin films formed on the substrates were irradiated with ultraviolet rays at radiation level of 3 J/Cm$^2$. The products were then dried by heating 1 min. at 150° C., whereby 7 to 8 µm-thick cured bodies of epoxy-containing organopolysiloxane resin were obtained. The obtained films were transparent, possessed elasticity and hardness sufficient to prevent easy deformation, had self-maintaining strength, and did not swell or dissolve after they were kept overnight in toluene. Following this, each liquid composition was poured into a container made from tetrafluoroethylene resin, and after holding for one day at room temperature, the toluene was removed from the compositions by heating at 50° C. Each composition contained in a respective container was irradiated with 10 J/cm$^2$ ultraviolet rays and formed into a 5 mm-thick cured body of the epoxy-containing organopolysiloxane resin. The produced cured bodies were checked with regard to refractive index and light transmittance. Results of measurements are shown in Table 1. Within the range of communication wavelengths, each body had transmittance of 94% and optical losses not exceeding 0.5 dB/cm. These values testify to the fact that the obtained cured bodies are suitable for use as light-transmitting components.

Practical Example 2

Manufacturing of Channel-Type Optical Waveguides Comprising Cured Bodies of Epoxy-Containing Organopolysiloxane Resins In a closed chamber system, Composition No. 2 from Table 1 was spin-coated onto a silicon substrate by 30 sec. spin coating at 2000 rpm, and the toluene was then removed by holding the coating for 15 min. at 50° C. The thin film formed on the substrate was irradiated with ultraviolet rays at radiation level of 3 J/cm$^2$. The product was then heated for 1 min. at 150° C., whereby a uniform 7 to 8 µm-thick cured film of epoxy-containing organopolysiloxane resin was obtained. The obtained film was used as a lower cladding layer and was spin-coated under the same conditions as above with Composition No. 1 from Table 1. The toluene was then removed by heating for 15 min. at 50° C. The film was exposed to 3 J/cm$^2$ ultraviolet ray radiation through an optical-path shaping glass mask of a rectangular configuration having a line width of 7 Elm and a length of 5 cm. The film was heated at 150° C. for 1 min., and the exposed areas were cured. The non-exposed areas were removed by dissolving with methylisobutylketone, whereby a core pattern was produced from the epoxy-containing organopolysiloxane resin having a uniform 7 µm thickness, 7 µm wide lines, and 5 cm length. The obtained lower cladding layer with the core pattern was spin coated in the closed chamber system with Composition No. 2 from Table 1 by 30 sec. spin-coating at 1000 rpm, and the coating was irradiated with 3 J/cm$^2$ ultraviolet rays, and heated for 1 min. at 150° C., whereby an upper cladding layer, comprising a cured body of a 15 µm-thick epoxy-containing organopolysiloxane resin, was formed on the lower cladding layer and the core pattern. The channel-type optical waveguide produced by the method described above did not have any intermixing between the core and cladding and had optical losses of 0.4 dB/cm. When this optical waveguide was heated in air to 280° C., the loss of weight did not exceed 1%. These characteristics testify to the fact that the obtained optical waveguide possesses excellent heat-resistant properties.

Practical Example 3

Manufacturing of Channel-Type Optical Waveguides Comprising Cured Bodies of Epoxy-Containing Organopolysiloxane Resins Ultraviolet ray-curable organopolysiloxane compositions were prepared by mixing the epoxy-containing organopolysiloxane resins (A1), (A2) obtained in the aforementioned Reference Examples, bis(dodecylphenol)iodonium hexafluoroantimonate as a photopolymerization initiator (B), and toluene as an organic solvent (C) in amounts indicated (in grams) in following Table 2.

TABLE 2

|  | Composition 6 | Composition 7 |
|---|---|---|
| (A1) | 30.0 | |
| (A2) | | 30.0 |
| (B) | 1.0 | 1.0 |
| (C) | 10.0 | 10.0 |
| Refractive index | 1.53 | 1.50 |

In a closed chamber system, Composition No. 7 from Table 2 was spin-coated onto a silicon substrate by 20 sec. spin coating at 1000 rpm, and the toluene was then removed by holding the coating for 15 min. at 50° C. The thin film formed on the substrates was irradiated with ultraviolet rays at radiation level of 3 J/cm$^2$. The product was then heated for 1 min. at 150° C., whereby a uniform 50 µm-thick cured film of the epoxy-containing organopolysiloxane resin was obtained. The obtained film was used as a lower cladding layer and was spin-coated under the same conditions as above with Composition No. 6 from Table 2. The toluene was then removed by heating for 15 min. at 50° C. The films were exposed to 3 J/cm$^2$ ultraviolet ray radiation through an optical-path shaping glass mask of a rectangular configuration having a line width of 50 µm and a length of 5 cm. The film was heated at 150° C. for 1 min., and the exposed areas were cured. The non-exposed areas were removed by dissolving with methylisobutylketone, whereby a core pattern was produced from the epoxy-containing organopolysiloxane resin having a uniform 48 µm thickness, 50 µm wide lines, and 5 cm length. The obtained lower cladding layer with the core pattern was coated by a solvent cast method with Composition No. 7 from Table 2, and the coating was irradiated with 3 J/cm$^2$ ultraviolet rays and heated for 1 min. at 150° C., whereby an upper cladding layer comprising a cured body of a 55 µm-thick epoxy-containing organopolysiloxane resin was formed on the lower cladding layer and the core pattern. The channel-type optical waveguide produced by the method described above did not have any intermixing between the core and cladding and had optical losses of 0.4 dB/cm. When this optical waveguide was heated in air to 280° C., the loss of weight did not exceed 1%. These characteristics testify to the fact that the obtained optical waveguide possesses excellent heat-resistant properties.

Practical Example 4

Manufacturing of Slab-Type Optical Waveguides Comprising Cured Bodies of Epoxy-Containing Organopolysiloxane Resin Composition No. 7 from Table No. 2 was applied in the form of a coating onto a glass substrate by a solvent cast method, and the toluene was then removed by holding the coating for 30 min. at 50° C. The thin film formed on the substrates was irradiated with ultraviolet rays at radiation level of 3 J/cm$^2$. The product was then heated for 1 min. at 150° C., whereby a uniform 60 μm-thick cured film of epoxy-containing organopolysiloxane resin was obtained. The obtained film had a refractive index of 1.519. The cured film was peeled off from the glass substrate at room temperature to form a lower cladding layer. The surface of the obtained lower cladding layer was coated, in the same manner as described above, with Composition No. 6 from Table 2. The toluene was then removed by heating for 30 min. at 50° C. The thin film was exposed to 3 J/cm$^2$ ultraviolet ray radiation, heated at 150° C. for 1 min., whereby a core layer comprising a cured body of the epoxy-containing organopolysiloxane resin of a uniform 55 μm thickness and with a refractive index equal to 1.539 was formed. The obtained core layer was coated in the same manner as described above with Composition No. 7 from Table 2, the toluene was removed by holding the product for 30 min. at 150° C., the coating was irradiated with ultraviolet rays at a radiation level of 3 J/cm$^2$, and heated for 1 min. at 150° C., whereby an upper cladding layer comprising a cured body of a 60 μm-thick epoxy-containing organopolysiloxane resin with a refractive index of 1.519 was obtained. The slab-type optical waveguide produced by the method described above did not have any intermixing between the core and cladding, did not produce cracks and did not peel off after multiple bending, and was not sensitive to polarization light. Optical losses were 0.6 dB/cm. The refractive index between the core and cladding did not change even after 2-min. heat treatment at 260° C.

Comparative Example 1

A liquid ultraviolet ray-curable organopolysiloxane resin composition was prepared by the method disclosed in Practical Example 1 of Kokai H9-124793 from 2 g of N-benzyl-4-benzoylpyridinium hexafluoroantimonate and 100 g of an epoxy-containing organopolysiloxane resin represented by the following average unit formula:

[PhE$^5$SiO$_{2/2}$]$_{0.51}$[PhSiO$_{3/2}$]$_{0.49}$ (where E$^5$ is a glycidoxy group of the following formula:

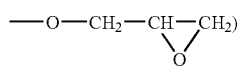

and obtained by adding water to a tetrahydrofurane solution of glycidyl alcohol and phenyltrichlorosilane and stirring the mixture for 2 hours at room temperature. A cladding layer was then formed by the method of Practical Example 2 from a cured body of a commercially available ultraviolet ray-curable liquid epoxy resin, and a channel-type optical waveguide was produced by forming a core layer in the form of a cured body of the aforementioned liquid ultraviolet ray-curable organopolysiloxane resin composition. The obtained optical waveguide had optical losses of 0.1 dB/cm. Furthermore, a slab-type optical waveguide was produced in accordance with the method of Practical Example 4 by preparing a cladding layer in the form of a cured body made from a commercially-available ultraviolet ray-curable epoxy resin and then producing a core layer in the form of a cured body of the aforementioned ultraviolet ray-curable organopolysiloxane resin composition. After the obtained slab-type optical waveguide was heat-treated for 2 hours at 260° C., the core layer had the refractive index increased by 0.8%, the cladding layer has the refractive index increased by 0.3%, and the difference between the refractive indices of the core and cladding layers has changed relative to the condition prior to heat treatment. Heat treatment reduced the weight of the optical waveguide by more than 3%. Thus, it can be concluded that heat-resistant properties of the optical waveguide have worsened.

Comparative Example 2

An epoxy-containing organosiloxane resin (number-average molecular weight: 4600, phenyl group content: 9 mole %, total content of silanol and methoxy groups: 0.8 mole %) expressed by the following average unit formula: Me$_2$SiO$_{2/2}$]$_{0.10}$ [MeSiO$_{3/2}$]$_{0.55}$ [PhSiO$_{3/2}$]$_{0.10}$ [E$^3$SiO$_{3/2}$]$_{0.25}$ was prepared by the same method as in Reference Example 1, with the exception that instead of 505 g of phenyltrichlorosilane the starting material comprised a mixture of 78 g of phenyltrichlorosilane with 302 g of methyltrichlorosilane. A liquid ultraviolet ray-curable organopolysiloxane resin composition was prepared by mixing 30 g of the aforementioned epoxy-containing organopolysiloxane resin, 1 g of bis(dodecylphenyl) iodinium hexafluoroantimonate, and 30 g of toluene. By the same method as in Practical Example 1, the composition was applied onto a substrate by spin-coating, irradiated with ultraviolet rays, and heat treated. As a result, a cured body of the epoxy-containing organopolysiloxane resin having a uniform thickness of 8.5 μm was produced. Although each of the thus produced cured body possessed transparency, had hardness and dynamic strength sufficient to protect the product from deformation, and was not subject to dissolving or swelling after keeping it overnight in toluene, it was inferior in toughness and developed some cracks. Moreover, its transmittance in the range of communication wavelengths was 87%, and therefore these products could not be used as light-transmitting components.

INDUSTRIAL APPLICABILITY

The active energy ray-curable organopolysiloxane resin composition of the present invention is well suited for the manufacture of light-transmitting components.

The light-transmitting component of the present invention is suitable for use in optical communication and for the manufacture of optical integrated circuits. The method of the present invention is useful for the manufacture of light transmitting components.

The invention claimed is:

1. An active energy ray-curable organopolysiloxane resin composition comprising:

(A) 100 parts by weight of an epoxy-containing organopolysiloxane resin represented by the following siloxane unit formula (1):

$$(R^1R^2R^3SiO_{1/2})_a(R^4R^5SiO_{2/2})_b(R^6SiO_{3/2})_c(SiO_{4/2})_d \quad (1)$$

where $R^1$, $R^2$, $R^3$, $R^4$, $R^5$, and $R^6$ are organic groups selected from univalent aliphatic hydrocarbon groups with 1 to 6 carbon atoms, univalent aromatic hydrocarbon groups with 6 to 10 carbon atoms, and epoxy-containing univalent hydrocarbon groups, wherein in one molecule the siloxane units with epoxy-containing univalent hydrocarbon groups constitute 2 to 50 mole %, the univalent aromatic hydrocarbon groups with 6 to 10 carbon atoms constitute more than 15 mole % of all organic groups, and where the following conditions are satisfied: a+b+c+d=1; "a" on average satisfies the following condition; $0 \leq a<0.4$; "b" on average satisfies the following condition; $0<b<0.5$; "c" on average satisfies the following condition; $0<c<1$; "d" on average satisfies the following condition; $0 \leq d<0.4$; "b" and "c" are bound by the following condition; $0.01 \leq b/c \leq 0.3$; and wherein the total content of alkoxy groups and hydroxyl groups on silicon atoms of the epoxy-containing organopolysiloxane resin is no more than 2 mole % of all substituents on silicon atoms;

(B) 0.05 to 20 parts by weight of a photopolymerization initiator; and (C) 0 to 5000 parts by weight of an organic solvent.

2. The active energy ray-curable organopolysiloxane resin composition according to claim 1 for use as a cured body in the form of a film.

3. The active energy ray-curable organopolysiloxane resin composition according to claim 1 for use as a light-transmitting component.

4. The active energy ray-curable organopolysiloxane resin composition according to claim 3 wherein said light-transmitting component is an optical waveguide.

5. The active energy ray-curable organopolysiloxane resin composition according to claim 1, wherein said active-energy rays are ultraviolet rays.

6. The active energy ray-curable organopolysiloxane resin composition according to claim 1, wherein the epoxy-containing organopolysiloxane resin represented by the siloxane unit formula (1) is selected from the group of organopolysiloxane resins composed of $(Me_2SiO_{2/2})$, $(PhSiO_{3/2})$, and $(E^1SiO_{3/2})$ units; $(Me_3SiO_{1/2})$, $(Me_2SiO_{2/2})$, $(PhSiO_{3/2})$, and $(E^1SiO_{3/2})$ units; $(Me_2SiO_{2/2})$, $(PhSiO_{3/2})$, $(E^1SiO_{3/2})$ and $(SiO_{4/2})$ units; $(Me_2SiO_{2/2})$, $(PhSiO_{3/2})$, $(MeSiO_{3/2})$, and $(E^1SiO_{3/2})$ units; $(Ph_2SiO_{2/2})$, $(PhSiO_{3/2})$, and $(E^1SiO_{3/2})$ units; $(MePhSiO_{2/2})$, $(PhSiO_{3/2})$, and $(E^1SiO_{3/2})$ units; $(Me_2SiO_{2/2})$, $(PhSiO_{3/2})$, and $(E^2SiO_{3/2})$ units; $(Me_2SiO_{2/2})$, $(PhSiO_{3/2})$, and $(E^3SiO_{3/2})$ units;$(Me_2SiO_{2/2})$, $(Ph_2SiO_{2/2})$, and $(E^1SiO_{3/2})$ units; $(Me_2SiO_{2/2})$, $(Ph_2SiO_{2/2})$, and $(E^3SiO_{3/2})$ units; $(Me_2SiO_{2/2})$, $(PhSiO_{3/2})$, and $(E^4SiO_{3/2})$ units; $(MeViSiO_{2/2})$, $(PhSiO_{3/2})$ and $(E^3SiO_{3/2})$ units; $(Me_2SiO_{2/2})$, $(PhSiO_{3/2})$, $(MeSiO_{3/2})$, and $(E^3SiO_{3/2})$ units; $(Ph_2SiO_{2/2})$, $(PhSiO_{3/2})$, and $(E^3SiO_{3/2})$ units; $(Me_2ViSiO_{1/2})$, $(Me_2SiO_{2/2})$, $(PhSiO_{3/2})$, and $(E^1SiO_{3/2})$ units; $(Me_3SiO_{1/2})$, $(Ph_2SiO_{2/2})$, $(PhSiO_{3/2})$, and $(E^1SiO_{3/2})$ units; $(Me_3SiO_{1/2})$, $(Me_2SiO_{2/2})$, $(PhSiO_{3/2})$, and $(E^3SiO_{3/2})$ units; $(Me_2SiO_{2/2})$, $(PhSiO_{3/2})$, $(E^3SiO_{3/2})$, and $(SiO_2)$ units; $(Me_2SiO_{2/2})$, $(Ph_2SiO_{2/2})$, $(E^1SiO_{3/2})$, and $(SiO_2)$ units; $(Me_3SiO_{1/2})$, $(Me_2SiO_{2/2})$, $(PhSiO_{3/2})$, $(E^1SiO_{3/2})$, and $(SiO_2)$ units; and $(Me_3SiO_{1/2})$, $(Me_2SiO_{2/2})$, $(PhSiO_{3/2})$, $(E^3SiO_{3/2})$, and $(SiO_2)$ units; wherein Me designates a methyl group, Vi designates a vinyl group, Ph designates a phenyl group, $E^1$ designates a 3-(glycidoxy)propyl group, $E^2$ designates a 2-(glycidoxycarbonyl)propyl group, $E^3$ designates a 2-(3,4-epoxycyclohexyl)ethyl group, and $E^4$ designates 2(4-methyl-3,4-epoxycyclohexyl) propyl group.

7. A light-transmitting component obtained by curing (A) an epoxy-containing organopolysiloxane resin represented by the following siloxane unit formula (1):

$$(R^1R^2R^3SiO_{1/2})_a(R^4R^5SiO_{2/2})_b(R^6SiO_{3/2})_c(SiO_{4/2})_d \quad (1)$$

where $R^1$, $R^2$, $R^3$, $R^4$, $R^5$, and $R^6$ are organic groups selected from univalent aliphatic hydrocarbon groups with 1 to 6 carbon atoms, univalent aromatic hydrocarbon groups with 6 to 10 carbon atoms, and epoxy-containing univalent hydrocarbon groups, wherein in one molecule the siloxane units with epoxy-containing univalent hydrocarbon groups constitute 2 to 50 mole %, the univalent aromatic hydrocarbon groups with 6 to 10 carbon atoms constitute more than 15 mole % of all organic groups, and where the following conditions are satisfied: a+b+c+d=1; "a" on average satisfies the following condition; $0 \leq a<0.4$; "b" on average satisfies the following condition; $0<b<0.5$; "c" on average satisfies the following condition; $0<c<1$; "d" on average satisfies the following condition; $0 \leq d<0.4$; "b" and "c" are bound by the following condition; $0.01 \leq b/c \leq 0.3$; and wherein the total content of alkoxy groups and hydroxyl groups on silicon atoms of the epoxy-containing organopolysiloxane resin is no more than 2 mole % of all substituents on silicon atoms under effect of irradiation with active energy rays in the presence of (B) a photopolymerization initiator where component (B) is used in an amount of 0.05 to 20 parts by weight for each 100 parts by weight of component (A).

8. The light-transmitting component according to claim 7, wherein said light-transmitting component is an optical waveguide.

9. The light-transmitting component according to claim 8, wherein said optical waveguide is made in the form of a film.

10. The light-transmitting component according to claim 7, wherein said active-energy rays are ultraviolet rays.

11. The light-transmitting component according to claim 7, wherein the epoxy-containing organopolysiloxane resin represented by the siloxane unit formula (1) is selected from the group of organopolysiloxane resins composed of $(Me_2SiO_{2/2})$, $(PhSiO_{3/2})$, and $(E^1SiO_{3/2})$ units; $(Me_3SiO_{1/2})$, $(Me_2SiO_{2/2})$, $(PhSiO_{3/2})$, and $(E^1SiO_{3/2})$ units; $(Me_2SiO_{2/2})$, $(PhSiO_{3/2})$, $(E^1SiO_{3/2})$ and $(SiO_{4/2})$ units; $(Me_2SiO_{2/2})$, $(PhSiO_{3/2})$, $(MeSiO_{3/2})$, and $(E^1SiO_{3/2})$ units; $(Ph_2SiO_{2/2})$, $(PhSiO_{3/2})$, and $(E^1SiO_{3/2})$ units; $(MePhSiO_{2/2})$, $(PhSiO_{3/2})$, and $(E^1SiO_{3/2})$ units; $(Me_2SiO_{2/2})$, $(PhSiO_{3/2})$, and $(E^2SiO_{3/2})$ units; $(Me_2SiO_{2/2})$, $(PhSiO_{3/2})$, and $(E^3SiO_{3/2})$ units; $(Me_2SiO_{2/2})$, $(Ph_2SiO_{2/2})$, and $(E^1SiO_{3/2})$ units; $(Me_2SiO_{2/2})$, $(Ph_2SiO_{2/2})$, and $(E^3SiO_{3/2})$ units; $(Me_2SiO_{2/2})$, $(PhSiO_{3/2})$, and $(E^4SiO_{3/2})$ units; $(MeViSiO_{2/2})$, $(PhSiO_{3/2})$, and $(E^3SiO_{3/2})$ units; $(Me_2SiO_{2/2})$, $(PhSiO_{3/2})$, $(MeSiO_{3/2})$, and $(E^3SiO_{3/2})$ units; $(Ph_2SiO_{2/2})$, $(PhSiO_{3/2})$, and $(E^3SiO_{3/2})$ units; $(Me_2ViSiO_{1/2})$, $(Me_2SiO_{2/2})$, $(PhSiO_{3/2})$, and $(E^1SiO_{3/2})$ units; $(Me_3SiO_{1/2})$, $(Ph_2SiO_{2/2})$, $(PhSiO_{3/2})$, and $(E^1SiO_{3/2})$ units; $(Me_3SiO_{1/2})$, $(Me_2SiO_{2/2})$, $(PhSiO_{3/2})$, and $(E^3SiO_{3/2})$ units; $(Me_2SiO_{2/2})$, $(PhSiO_{3/2})$, $(E^3SiO_{3/2})$, and $(SiO_2)$ units; $(Me_2SiO_{2/2})$, $(Ph_2SiO_{2/2})$, $(E^1SiO_{3/2})$, and $(SiO_2)$ units; $(Me_3SiO_{1/2})$, $(Me_2SiO_{2/2})$, $(PhSiO_{3/2})$, $(E^1SiO_{3/2})$, and $(SiO_2)$ units; and $(Me_3SiO_{1/2})$, $(Me_2SiO_{2/2})$, $(PhSiO_{3/2})$, $(E^3SiO_{3/2})$, and $(SiO_2)$ units; wherein Me designates a methyl group, Vi designates a vinyl group, Ph designates a phenyl group, $E^1$ designates a 3-(glycidoxy)propyl group, $E^2$ designates a 2-(glycidoxycarbonyl)propyl group, $E^3$ designates a 2-(3,4-epoxycyclohexyl)ethyl group, and $E^4$ designates 2-(4-methyl-3,4-epoxycyclohexyl) propyl group.

12. A method of manufacturing a light-transmitting component, comprising the steps of: applying the active energy ray-curable organopolysiloxane resin composition of claim 1 onto a substrate; and curing the applied composition by irradiating it with active-energy rays.

13. A method of manufacturing an optical waveguide, comprising the steps of: 1) forming a lower cladding layer by applying the active energy ray-curable organopolysiloxane resin composition of claim 1 onto a substrate and by curing the applied material by irradiating it with active-energy rays; 2) forming a core layer by applying the active energy ray-curable organopolysiloxane resin composition of claim 1 onto the lower cladding layer and by curing the applied layer by irradiating it with active energy rays; optionally, processing the core layer into a desired shape; and 3) forming an upper cladding layer by applying the active energy ray-curable organopolysiloxane resin composition of claim 1 onto the core layer, and curing the applied material by irradiating it with active-energy rays.

14. The method of manufacturing an optical waveguide according to claim 13, wherein the refractive index of the cured body is greater than the refractive index of the cladding layer.

* * * * *